Nov. 26, 1963    H. LOGEMANN ETAL    3,112,223
METHOD FOR COATING A WIRE WITH A HEAT-CURED
ACRYLONITRILE COPOLYMER AND COATED ARTICLE
Filed June 5, 1961
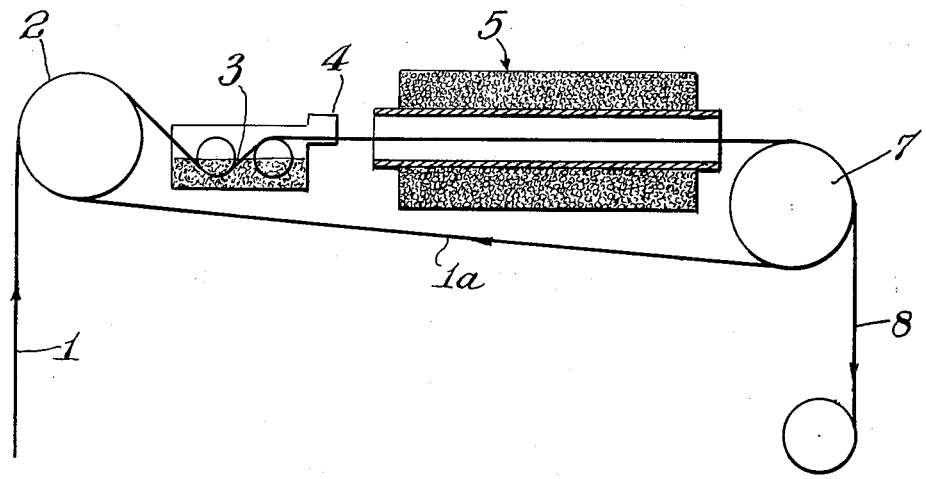
INVENTORS:
Heino Logemann,
Wilhelm Becker,
& Günter Kolb.
BY Connolly and Hutz
ATTORNEYS United States Patent Office 3,112,223
Patented Nov. 26, 1963

3,112,223
METHOD FOR COATING A WIRE WITH A HEAT-CURED ACRYLONITRILE COPOLYMER AND COATED ARTICLE
Heino Logemann, Leverkusen, and Wilhelm Becker and Günter Kolb, Cologne-Stammheim, Germany, assignors to Farbenfabriken Bayer Aktiengesellschaft, Leverkusen, Germany, a corporation of Germany
Filed June 5, 1961, Ser. No. 114,611
Claims priority, application Germany June 9, 1960
5 Claims. (Cl. 117—232)

The present invention relates to coatings and films on the basis of copolymers and a process for production of these coatings and films.

It is known that it is possible to produce coatings or the like and films using aqueous dispersions of vinyl polymers or copolymers, such as otherwise can only be obtained using solutions of these polymers in organic solvents. When using unsaturated polymers, it is known that the properties of the film at high temperatures can be improved with vulcanising agents. It has also already been proposed to incorporate several reactive groups, such as epoxide or carboxyl groups, into copolymers, in order in this way to impart to the products an improved capacity for crosslinking when they are subjected to a subsequent heat treatment.

It has now been found that by comparison with known processes, coatings having a particularly high capacity for crosslinking at high temperature can be obtained if there are used for the production of such coatings, dispersions of ternary copolymers which are obtained by copolymerisation of 50–80% by weight of acrylonitrile, of at least 10% by weight of an ester of acrylic acid or methacrylic acid with a saturated aliphatic monohydric alcohol having 1 to 12 carbon atoms and of 0.5–15% by weight of a polymerisable monoethylenically unsaturated carboxylic acid amide or their functional derivatives.

The drawing illustrates one embodiment of the coating process of the present invention.

Those aqueous dispersions of copolymers containing as main component acrylonitrile in a proportion of 50–80% by weight, and with a preferred range 55–65% by weight, related to the total monomer in each case are to be considered for the process according to the invention.

Esters of acrylic or methacrylic acid or mixtures thereof in a proportion of at least 10% by weight, usually up to 40% by weight, in particular 25–35% by weight, may be used as second component.

As alcohol components for the aforesaid esters, esters of the various types of monohydric alcohols, for example saturated aliphatic straight-chain or branched alcohols with 1 to 12 carbon atoms, such as for example methyl, ethyl, propyl, isopropyl, hexyl, decyl and dodecyl esters, in particular the butyl esters may be considered. It is, of course, also possible for esters of other alcohols to be introduced. If the esters of acrylic acid are wholly or partially replaced by the esters of methacrylic acid, correspondingly higher proportions, i.e. at least 30% by weight calculated on the total amount of the monomers, are required for producing the same plasticising effect, since the latter do not impart the necessary high elasticity to the film to be produced in the same way as acrylic acid.

The third important component of the ternary copolymers referred to are carboxylic acid amides with polymerisable olefinic double bond, preferably monoethylenically unsaturated carboxylic acid amides. According to the present invention by the term "polymerizable monoethylenically unsaturated carboxylic acid amide" furthermore there are to be understood derivatives of these carboxylic acid amides. Obviously mixtures of these components with one another may be employed. These acid amides should be present in the copolymer in quantities of 0.5–15% by weight, advantageously 5–10% by weight.

Unsaturated acid amides which are particularly of use are acrylic and methacrylic acid amides, but the use of other unsaturated acid amides, such as those of fumaric, maleic and itaconic acids is not excluded.

By derivatives of unsaturated carboxylic acid amides within the scope of the present invention, are to be understood N-methylol compounds of acid amides, N-methylol ether of acid amides, such as for example the methyl or ethyl methylol ethers and also Mannich bases of N-methylol ethers of such amides. The last-mentioned compounds can be obtained for example by the process of German Auslegeschrift 1,102,157, by reacting the said starting components, in particular acrylic and methacrylic amides, with formaldehyde and secondary amines. Suitable secondary amines are for example aliphatic amines, such as dimethylamine, diethylamine and homologues thereof, araliphatic amines, such as N-methylaniline, N-ethylaniline, dibenzylaniline, cycloaliphatic amines, such as N-methylcyclohexylamine and heterocyclic amines, such as morpholine.

As further examples of derivatives of unsaturated carboxylic acid amides there are to be mentioned compounds of the type of acrylamides or methacrylamides of amino benzoic acids, for example, of o- or p-amino benzoic acid.

The aqueous polymer dispersions are prepared in a manner known per se by polymerising the monomer mixtures, advantageously using Redox systems based on peroxide compounds, such as for example alkali metal persulphates on the one hand and compounds of sulphur in low valency states, such as for example alkali metal pyrosulphite, alkali metal bisulphite, formaldehyde sulphoxylate or farmamidine-sulphonic acid, on the other hand. It is of course also possible to use Redox systems when working in alkali medium, for example using diethylene triamine, etc. Similarly, it is possible to introduce Redox systems in a manner known per se in combination with heavy metal ions, if desired in the presence of complex formers, such as pyrophosphates or ethylenediamine tetra-acetic acid. These Redox systems are applied in usual amounts, i.e. ranging between 0.1 and 2% by weight, calculated on the total amount of the monomers employed.

As emulsifiers, there can be used the various types of water-soluble compounds normally to be employed for this purpose, for example fat alcohol sulphonates (i.e. containing a long chain aliphatic saturated monohydric alcohol from 10–20 carbon atoms), such as lauryl alcohol sulphonate, fat alcohol sulphates, succinic acid dioctyl ester sulphonate, aromatic alkyl sulphonates such as octyl or isododecyl benzene-sulphonate if desired in combination with ethylene oxide derivatives of alkylated phenols or fatty alcohols. These emulsifiers are advantageously introduced in small concentrations, advantageously in a concentration of about 0.5–1% by weight, related to the monomer. Instead of these conventional water-soluble emulsifiers, it is also possible to employ solid dispersing agents, such as finely divided magnesium hydroxide and the like.

The pH value of the polymerisation medium depends on the activator system as well as the acidic components which are used and may range from 2 to 10.

The polymerisation temperature is advantageously between 30 and 90° C.

The concentration of the polymer emulsions is preferably adjusted to 30–50% by weight (solid contents).

The present process for the production of coatings also allows variation in those copolymers which can be used additionally for production of the polymer emulsions. For example, as additional polymerisation components, it is possible to introduce acrylic or methacrylic acid esters of dihydric or polyhydric alcohols or amino alcohols, such as for example of glycol, diglycol, glycerine, pentaerythritol, butane-1,3-diol, trimethyl propane aminoethanol and other alcohols, the quantity thereof preferably not exceeding 10% by weight, calculated on the total quantity of monomer. Furthermore, it is possible, especially when using compounds with active hydrogen atoms, such as the aforementioned acrylic acid ester derivatives of polyhydric alcohols, to incorporate by polymerisation other components which contain blocked isocyanate groups. Suitable unsaturated, polymerisable compounds with blocked isocyanate groups are addition compounds of unsaturated, polymerisable isocyanates, such as acrylic acid ester isocyanates, allyl ether isocyanates, styryl isocyanate or vinylisocyanate with phenols, tertiary alcohols, hydrocyanic acid or with compounds with activated methylene groups, such as malonic or acetoacetic esters. Such adducts have the property of already splitting at temperatures below 200° C. with formation of reactive isocyanate groups. Compounds of this nature are preferably used in quantities which are equivalent to the number of the active hydrogen atoms of the other monomers and the like and generally do not exceed 10% by weight.

Apart from the known components for the production of the above copolymer dispersions, it is also possible in addition for other vinyl compounds to be incorporated by polymerisation in amounts of about 2 to 20% by weight. Suitable vinyl compounds are for example styrenes, styrenes alkylated in the nucleus or on the side chains, such as $\alpha$-methylstyrene and vinyltoluene, furthermore vinylhalides such as vinyl chloride and vinylidene chloride as well as vinylesters such as vinyl acetate and vinylpropionate, vinylethers as for example vinyl methylether, also vinylketones and the like.

In a large number of cases, it is also advisable to add $\alpha,\beta$-olefinically unsaturated copolymerisable carboxylic acid in quantities of 0.1 to at the most 5% by weight. The following compounds are to be mentioned as copolymerisable unsaturated acids which may be used in this connection: acrylic acid, methacrylic acid, and the ester acids of polyvalent, unsaturated acids, preferably aliphatic $\alpha,\beta$-unsaturated dicarboxylic acids, such as for example semiesters of maleic acid and fumaric acid.

The aqueous polymer dispersion may be adjusted to a pH value ranging from 2 to 10 before use, especially if no blending with alkaline condensed phenol-formaldehyde resin is intended. According to the preferred embodiment of the present invention and with respect to corrosion problems in the case of metallic supports as well as stability of the dispersion the copolymer dispersion is adjusted to a pH value of about 6–10, preferably 8.5 by means of aqueous ammonia. The production of the polymer films, coatings and the like is effected in a manner known per se, for example by brushing or spraying on to the supports which are to be coated and which if necessary are initially primed. As a result of the nature of the copolymerisation components and also because of the quantity thereof, the coatings and films obtained with the dispersions have a high resistance to solvents as for example aromatic and aliphatic hydrocarbons such as petrol hydrocarbons, benzene, toluene, furthermore alcohols (ethanol, methanol) ketones, esters and the like, and also show high mechanical resistance after a thermal after-treatment, generally at temperatures above 100° C. With metal sheets, the temperature range for this thermal after-treatment is preferably between 100 and 150° C.

Wire may be lacquered in the usual manner without any priming, by conveying the wires through an application bath containing said copolymer dispersion for several times, usually six, and hardening in each case in a drying shaft temperature of 280–300° C. and a withdrawal speed of 6–10 m./min.

Organic solvents may be added when using these emulsions, advantageously water-soluble solvents dissolving polyacrylonitrile, in order to improve the film formation.

Solvents which may be mentioned are: dimethyl formamide, glycol carbonate, tetramethylene-sulphone, etc. These solvents should be applied in amounts of from 3 to 10% by weight, related on the total polymer.

For the production of coatings and films, various pigments, fillers, dyestuffs, plasticisers, stabilisers and age resisters can be added to the emulsions as well as other film formers, provided they are compatible with the copolymers to be used in accordance with the process.

One particular advantage when working with such dispersions stems from the possibility of operating completely without solvents or alternatively only with very small amounts of specific solvents, so that explosions, fires and also the nuisance due to waste vapours are obviated.

Coatings which can be obtained by the process of the invention are especially suitable for the insulation of electric conductors, on account of their very good mechanical and electrical properties, in particular their high flexibility, thermal stability, surface hardness and resistance to solvents with simultaneous high electrical disruptive strength and good insulation resistance. These properties are especially pronounced with acrylonitrile contents of at least 50% by weight and especially with contents of 60–70% by weight.

The coatings obtainable by the foregoing process are suitable for covering various types of materials, and especially of those supports which permit of a thermal after-treatment, such as metallic supports, such as wires, metal tyres, etc. It is thus also possible to prepare metal primings, paints for refrigerators, washing machines, kitchen cabinets and the like.

The parts indicated in the following examples are parts by weight, unless otherwise indicated.

*Example 1*

A solution of 1 part of lauryl sulphate and 0.3 part of ammonium persulphate in 135 parts of water is heated to 45° C. and mixed, in a nitrogen atmosphere, with a solution of 0.5 part of sodium pyrosulphite $Na_2S_2O_5$ in 15 parts of water. A mixture of 65 parts of acrylonitrile, 31 parts of butyl acrylate and 0.5 part of dodecylmercaptan, as well as a solution of 7.5 parts of methacrylamide in 50 parts of water, are then simultaneously run in so quickly that a temperature of 45–50° C. is maintained during the polymerisation. The total time required for this operation is about 3 hours. After another 2 hours at 45–60° C., the reaction is completed. The latex which is formed is freed from any residues of unreacted monomers in vacuo and with stirring. It has a concentration of 35% and the K value of the precipitated material (according to Fikentscher, Cellulosechemie, 13 (1932), 60), is 74.

After adding 8 parts of dimethyl formamide to the the latex thus prepared, the latter is capable of producing highly lustrous and elastic coatings on copper wires. For this purpose, the wire is guided several times, usually 6 times, through an application bath in the manner known in the art and the lacquer film is hardened each time in a drying shaft at a temperature of 280° C. with a withdrawal speed of 6–10 m./min. A lacquered wire produced in this way, having a diameter of 0.7 mm., has a lacquer coating of about $50\mu$, a pencil hardness of 5 H, which is only reduced to 2–3 H after an alcohol treatment in accordance with DIN 46453. The cut through is on average at 250° C. in accordance with the same standard. Satisfactory results are produced in the flexibility test after an initial elongation of 20% and a winding stress about its own diameter, even when the specimen being tested is subjected to a thermal shock treatment at 155° C. For details of said tests compare NEMA (National Electrical Manufacturers Association) Standards Publication No. MW 2, 1959. The test for resistance to abrasion, carried out with the standard apparatus in accordance with the American standards, shows 50–70 rubbings.

The breakdown voltage, measured on twisted specimens of wire, is in the region of 5 kv.

The wire-lacquering process described above is illustrated in Example 1. A bare copper wire 1 is advanced from a storage roll (not shown) via a guide roll 2 through enamelling bath 3, stripper 4 and bake oven 5 and taken up on a second guide roll 7. From guide roll 7 the lacquered wire is returned (see 1a) to guide roll 2, enamelling bath 3, etc. Depending on the desired thickness of the coating, 4–6 or more layers are applied in this manner. Finally, the finished wire is passed from second guide roll 7 to wind-up device 8.

If the quantity of acrylonitrile in the polymerisation mixture which has been described is reduced to 45 parts with simultaneous increase in the quantity of butyl acrylate to 50 parts, it is no longer possible to produce sufficiently hard lacquer coatings, even with 10 parts of methacrylamide.

When the pencil hardness of the lacquer coatings, measured in air, is 4 H, the pencil hardness after alcohol treatment is still only 2B to 3B, the number of rubbings is reduced to 10 and the cut through is low.

*Example 2*

A solution of 0.5 part of lauryl sulphate and 0.3 part of ammonium persulphate in 150 parts of water is heated to 85° C. and a mixture of 65 parts of acrylonitrile, 31 parts of butyl acrylate and 4 parts of methacrylic acid is run in so quickly within 5 hours, in a nitrogen atmosphere and while stirring, simultaneously with a solution of 7.5 parts of methacrylamide in 50 parts of water, that a gentle reflux is maintained. After another 3 hours at 80–85° C., the latex which is formed is freed from small residues of unreacted monomers while stirring in vacuo. The concentration of the slightly yellow-coloured latex is 36% and the K value of the precipitated material is 82.

The testing of the latex as a wire lacquer under the conditions mentioned in Example 1 produces, after adding 8 parts of dimethyl formamide and with a shaft temperature of 300° C., a lacquer coating of 50μ, a pencil hardness of 6 H, and of H–H 2 after alcohol treatment, satisfactory windings, a cut through of 250° C. and a rubbing number of 35–50.

*Example 3*

A solution of 0.5 part of lauryl sulphate and 0.3 part of ammonium persulphate in 135 parts of water is heated to 45° C. and a solution of 0.5 part of sodium pyrosulphite in 15 parts of water is added under nitrogen. A solution of 65 parts of acrylonitrile, 31 parts of butyl acrylate, 0.5 part of dodecylmercaptan and 4 parts of methacrylic acid, are run in with stirring at the same time as a solution of 5 parts of methacrylic acid amide-methylol ether

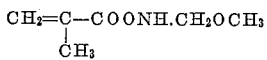

in 50 parts of water, over a period of 3 hours, and allowed to react finally for another 3 hours after completing the running-in operation. 500 parts of the latex freed from residual monomers are neutralised with 15.5 parts of an aqueous ammonia solution diluted 10 times, with control by a glass electrode, to a pH value of 7.

On testing as a wire lacquer and with a shaft temperature of 300° C. and a withdrawal speed of 6–8 m./min. of the copper wire with a thickness of 0.7 mm., coating thicknesses of 45–50μ are obtained. They show a pencil hardness of 5 H, and of H in alcohol. The windings are defect-free, the rubbing number is 30 and the softening temperature is 225° C.

*Example 4*

A solution of 0.13 part of ammonium persulphate in 5 parts of water is added at 85° C. to a solution of 1 part of lauryl sulphate in 135 parts of water in a polymerisation vessel after displacing the air by nitrogen. Thereafter, 65 parts of acrylonitrile, 31 parts of butyl acrylate, a solution of 5 parts of methacrylamide and 5 parts of the methacrylic acid amide of p-aminobenzoic acid in 50 parts of water are polymerised by the simultaneous dropwise addition to the ammonium persulphate-lauryl sulphate solution with vigorous stirring.

The methacrylic acid amide of p-aminobenzoic acid is obtained by a process known per se by reacting p-aminobenzoic acid with methacrylic acid chloride in aqueous solution at a temperature of 0–10° C. and a pH value of 9–4. The amide is precipitated by acidifying the aqueous solution to pH 1–2 and dried. It constitutes a white crystalline powder which takes up the calculated quantity of hydrogen on catalytic reduction and contains no free amino groups. The aqueous solution of the acid amide used for the polymerisation is obtained by adding a little ammonia to the aqueous suspension of this compound.

During the polymerisation, a pH value of 7–8 is maintained by adding ammonia. The dropwise addition of the monomers should be completed after 5 hours and, during this time, there are also added to the polymerisation mixture 0.2 part of ammonium persulphate as a 2% aqueous solution the mixture then being stirred for another 7 hours at a temperature of 80–85° C.

The latex which forms is freed in vacuo from monomer residues and is then brought to a pH value of 8.5 by adding a small quantity of approximately 5% aqueous ammonia solution.

After adding 10% of dimethyl formamide and 15% of a water-soluble phenol formaldehyde condensation resin (based on polymer) with a shaft temperature of 380° C. and a withdrawal speed of 8–11 m./min., the test of the latex as a wire lacquer under the conditions mentioned in Example 1 shows a lacquer coating with a thickness of 55μ, which runs satisfactorily on the surface, a pencil hardness in air of 7 H and of 2 H after being kept in alcohol, satisfactory windings, even after 10–20% elongation, a rubbing number according to NEMA of 50–60, a bonding strength of 120–140, a breakdown voltage of 6–8000 volts and a softening temperature of 240–295° C.

Without the addition of the methacrylamide components, the softening temperature is for example about 100° lower.

*Example 5*

The air in a polymerisation vessel is displaced by nitrogen and a solution of 0.13 part of ammonium persulphate in 5 parts of water is added at 85° C. to a solution of 1 part of lauryl sulphate in 135 parts of water in the said vessel. Thereafter, 65 parts of acrylonitrile, 31 parts of butyl acrylate, a solution of 7.5 parts of methacrylamide in 25 parts of water and a solution of 5 parts of the methacrylamide of o-aminobenzoic acid in 25 parts of water are polymerised by simultaneous dropwise addition to the initially supplied ammonium persulphate-lauryl sulphate solution with vigorous stirring.

The methacrylic acid amide of 2-aminobenzoic acid is obtained by a method known per se by reacting 2-aminobenzoic acid with methacrylic acid chloride in aqueous solution at a temperature of 0–10° C. and a pH value of 9–4. The amide is precipitated by acidifying the aqueous solution to pH 1–2 and dried. It is a white crystalline powder which, with catalytic reduction, takes up the calculated quantity of hydrogen and contains no free amino groups. The aqueous solution of the acid amide used in the polymerisation is obtained by adding the equivalent quantity of ammonia to the aqueous suspension of this compound.

During the polymerisation, a pH value of 7–8 is maintained by adding ammonia. The dropwise addition of the monomers should be completed after 5 hours and, during this time, another 0.2 part of ammonium persulphate as a 2% aqueous solution is added to the polymerisation mixture and thereafter the latter is stirred for another 7 hours at 80–85° C.

The latex which forms is freed from monomer residues in vacuo and thereafter is brought to a pH of 8.5 by adding a small quantity of about 5% aqueous ammonia solution.

After adding 10% of dimethyl formamide and 15% of a water-soluble phenol formaldehyde condensation resin (based on polymer), with a shaft temperature of 380° C. and a withdrawal speed of 8–11 m./min., the test of the latex as a wire lacquer under the conditions mentioned in Example 1 shows a lacquer coating with a thickness of 55μ, which runs satisfactorily on the surface, a pencil hardness in air of 6 H and, after being kept in alcohol, of H–2 H, satisfactory windings, even after 10 and 20% initial elongation, a rubbing number according to NEMA of 40–55, a bonding strength of 115–200, a breakdown voltage of 5000 volts and a softening temperature of 210–265° C.

Without the addition of the methacrylamide components, the softening temperature is for example about 100° C. lower.

In the foregoing examples it is possible to use instead of butyl acrylate esters such as butyl methacrylate, propyl acrylate, and ethyl acrylate, and to use instead of methacrylamide such amides as acrylamide, N-substituted acrylamides, and N-substituted methacrylamides without substantially decreasing the properties of the coatings.

What we claim is:

1. In a process of forming a coated article wherein a thin layer of a copolymer latex is applied to the surface of said article and then heated to a temperature of 100°–300° C., the improvement comprising employing as said copolymer latex one prepared by the emulsion copolymerization of (a) 50–80% by weight of acrylonitrile, (b) at least 10% by weight of an unsaturated acid ester selected from the group consisting of an acrylic acid ester of a saturated aliphatic monohydric alcohol of 1–12 carbon atoms and a methacrylic acid ester of a saturated aliphatic monohydric alcohol of 1–12 carbon atoms, and (c) 0.1–15% by weight of a copolymerizable monoethylenically unsaturated carboxylic acid amide, the resulting heat-cured copolymer coating having excellent electrical insulating properties.

2. In a process wherein an electrically conductive metal wire is coated with an insulating composition by applying a thin layer of a copolymer latex to the wire by conveying the wire through said latex several times, and subsequently hardening the resulting coating by passing the coated wire through a heat-curing zone, the improvement comprising employing as said copolymer latex one prepared by the emulsion polymerization of (a) 50–80% by weight of acrylonitrile, (b) at least 10% by weight of an unsaturated acid ester selected from the group consisting of an acrylic acid ester of a saturated aliphatic monohydric alcohol of 1–12 carbon atoms and a methacrylic acid ester of a saturated aliphatic monohydric alcohol of 1–12 carbon atoms, and (c) 0.1–15% by weight of a copolymerizable monoethylenically unsaturated carboxylic acid amide, the resulting heat-cured copolymer coating having excellent electrical insulating properties.

3. The process of claim 2 wherein said wire is dried by passing through a drying zone having a temperature of 280°–300° C. and is withdrawn therefrom at a speed of 6–10 meters per minute.

4. A coated article, the adherent surface coating of which comprises a heat-cured acrylonitrile copolymer of improved electrical insulating properties, said coating being obtained by applying to a solid substrate a thin layer of a copolymer prepared by the emulsion copolymerization of (a) 50–80% by weight of acrylonitrile, (b) at least 10% by weight of an unsaturated acid ester selected from the group consisting of an acrylic acid ester of a saturated aliphatic monohydric alcohol of 1–12 carbon atoms and a methacrylic acid ester of a saturated aliphatic monohydric alcohol of 1–12 carbon atoms, and (c) 0.1–15% by weight of a copolymerizable monoethylenically unsaturated carboxylic acid amide, followed by the step of heating said copolymer layer to a temperature of 100°–300° C., the resulting heat-cured copolymer coating having excellent electrical insulating properties.

5. An electrically conductive wire coated with an insulating layer of a terpolymer of acrylonitrile, said coating being obtained by applying to the wire a thin layer of said terpolymer prepared by the emulsion copolymerization of (a) 50–80% by weight of acrylonitrile, (b) at least 10% by weight of an unsaturated acid ester selected from the group consisting of an acrylic acid ester of a saturated aliphatic monohydric alcohol of 1–12 carbon atoms and a methacrylic acid ester of a saturated aliphatic monohydric alcohol of 1–12 carbon atoms, and (c) 0.1–15% by weight of a copolymerizable monoethylenically unsaturated carboxylic acid amide, said coating being applied by passing the wire through a bath of said latex several times and subsequently hardening said layer on the wire by passing the latter through a drying zone, having a temperature of 280°–300° C., at a withdrawal speed of 6–10 meters per minute.

References Cited in the file of this patent

UNITED STATES PATENTS

| | | |
|---|---|---|
| 2,662,875 | Chaney | Dec. 15, 1953 |
| 2,751,315 | Staehle | June 19, 1956 |
| 2,753,318 | Maeder | July 3, 1956 |
| 2,787,561 | Sanders | Apr. 2, 1957 |
| 2,795,564 | Conn et al. | June 11, 1957 |
| 2,834,993 | Dipner | May 20, 1958 |

FOREIGN PATENTS

| | | |
|---|---|---|
| 1,026,387 | Germany | Mar. 20, 1958 |